United States Patent
McKinley (10) Patent No.: US 9,660,802 B1
(45) Date of Patent: May 23, 2017

(54) SYSTEMS AND METHODS FOR GENERATING AND STORING SILICON FINGERPRINTS FOR A SECURITY CHIP

(71) Applicant: Marvell International Ltd., Hamilton (BM)

(72) Inventor: Patrick A. McKinley, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 137 days.

(21) Appl. No.: 14/563,110

(22) Filed: Dec. 8, 2014

Related U.S. Application Data (60) Provisional application No. 61/915,409, filed on Dec. 12, 2013.

(51) Int. Cl.
*H04L 9/00* (2006.01)
*H04L 9/06* (2006.01)

(52) U.S. Cl.
CPC .................................... *H04L 9/065* (2013.01)

(58) Field of Classification Search
CPC ..... H04L 9/22; H04L 9/18; H04L 9/26; H04L 9/08; G06F 7/582
USPC ................................................. 380/46; 326/8
See application file for complete search history.

(56) References Cited

U.S. PATENT DOCUMENTS

| | | | |
|---|---|---|---|
| 5,225,719 A | 7/1993 | Agrawal et al. | |
| 5,270,983 A | 12/1993 | Wuertz et al. | |
| 5,486,776 A | 1/1996 | Chiang | |
| 5,487,039 A | 1/1996 | Sukegawa | |
| 5,530,753 A | 6/1996 | Easter et al. | |
| 6,014,052 A | 1/2000 | Coupe, II | |
| 7,198,348 B2 | 4/2007 | Hu | |
| 7,280,772 B2 | 10/2007 | Adkins et al. | |
| 7,401,223 B2 | 7/2008 | Walmsley | |
| 7,495,970 B1 | 2/2009 | Tang et al. | |
| 7,710,813 B1 | 5/2010 | Im et al. | |
| 9,090,079 B2 | 7/2015 | Kosugi | |
| 2006/0143454 A1* | 6/2006 | Walmsley | G06F 21/85 713/170 |
| 2010/0157003 A1 | 6/2010 | Edwards | |
| 2010/0328405 A1 | 12/2010 | Ness et al. | |
| 2013/0057921 A1 | 3/2013 | Tay et al. | |

\* cited by examiner

*Primary Examiner* — Baotran N To (57) ABSTRACT

A security chip including a fusible logic array. The fusible logic array is configured to receive a plurality of seed values and output a plurality of respective keys using the received plurality of seed values. The respective keys correspond to logic results generated by the fusible logic array. The fusible logic array includes one or more fusible links. A key storage control module is configured to receive the plurality of seed values, receive the plurality of respective keys, and store, in memory, a selected first seed value of the plurality of seed values and a selected first key of the plurality of respective keys. The selected first seed value and the selected first key are stored as a seed-key pair.

15 Claims, 9 Drawing Sheets

Full OCR skipped due to length?

SYSTEMS AND METHODS FOR GENERATING AND STORING SILICON FINGERPRINTS FOR A SECURITY CHIP

CROSS-REFERENCE TO RELATED APPLICATIONS

This application claims the benefit of U.S. Provisional Application No. 61/915,409, filed on Dec. 12, 2013.

This application is related to U.S. patent application Ser. No. 14/563,071 filed on Dec. 8, 2014. The entire disclosures of the applications referenced above are incorporated herein by reference.

FIELD

The present disclosure relates system-on-chip (SoC) security, and more particularly to systems and methods for preventing reverse engineering of SoCs.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

For secure applications, systems-on-chips (SoCs) are typically designed and built to satisfy certain customer requirements. These requirements can be directed to protecting embedded information, such as encryption keys and other secret information, from being copied without authorization. The requirements can also be directed to authenticating origin and identification of a chip for use in a system, and preventing others from copying, cloning, and/or building counterfeit copies of the chip. Although the counterfeit copies can operate and appear the same as the original chip, the counterfeit copies can subvert operational intent of the original chip and/or business interests of the design and manufacturer of the original chip.

Various design techniques, system architectures, and security programs are used as counter-measures in manufacturing life cycles to protect sensitive information and to provide a check on chip authenticity. Traditionally, these were effective counter-measures to prevent competitors, clone manufacturers and/or chip counterfeiters from copying chips and/or extracting sensitive encryption keys and secret data.

The threat of having a chip copied and/or sensitive information extracted has evolved and included advanced reverse engineering techniques meant to extract key secrets or key circuit functionality from a chip based on logic-based estimates (or educated guesses). Complete physical circuit and memory data extraction from a chip has been performed to enable a counterfeit chip to be designed and produced. While an expensive undertaking, this extraction allows a counterfeit chip to be constructed having the same unique identity and secret keys as an original chip. Counterfeit copies generated using this type of extraction only succeed (i.e. operate the same and/or perform the same functions as the original chip) after replicating physically apparent attributes of the original chip and then correcting for any extraction errors.

An advanced state-of-the-art technique includes examining small portions of a chip layer-by-layer as the chip is deprocessed. Deprocessing of a chip includes stripping a chip layer-by-layer to expose visible features in each of the layers. This is done until reaching the lowest level (or substrate) of the chip. Apparent structures are synthesized in each portion of the chip to provide a netlist of connected device structures. The resulting netlist is simulated in a field-programmable gate array (FPGA). The extraction errors are iteratively resolved until the extracted circuit (i.e. circuit built as a copy of the original chip) begins to operate the same as the original chip. While time consuming, error-prone, and expensive, this technique remains a viable technique to reverse engineer a chip.

SUMMARY

A security chip includes a fusible logic array configured to receive a plurality of seed values and output a plurality of respective keys using the received plurality of seed values. The respective keys correspond to logic results generated by the fusible logic array. The fusible logic array includes one or more fusible links. A key storage control module is configured to receive the plurality of seed values, receive the plurality of respective keys, and store, in memory, a selected first seed value of the plurality of seed values and a selected first key of the plurality of respective keys. The selected first seed value and the selected first key are stored as a seed-key pair.

A method for operating security chip includes, using a fusible logic array, receiving a plurality of seed values and outputting a plurality of respective keys using the received plurality of seed values. The respective keys correspond to logic results generated by the fusible logic array. The fusible logic array includes one or more fusible links. The method further includes receiving the plurality of seed values, receiving the plurality of respective keys, and storing, in memory, a selected first seed value of the plurality of seed values and a selected first key of the plurality of respective keys. The selected first seed value and the selected first key are stored as a seed-key pair.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Traditional systems-on-chips (SoCs) may be cloned using various reverse engineering, deprocessing, and/or extraction techniques. Systems and methods according to the principles of the present disclosure prevent SoCs from being cloned and/or counterfeit chips from being manufactured.

Figure 1:
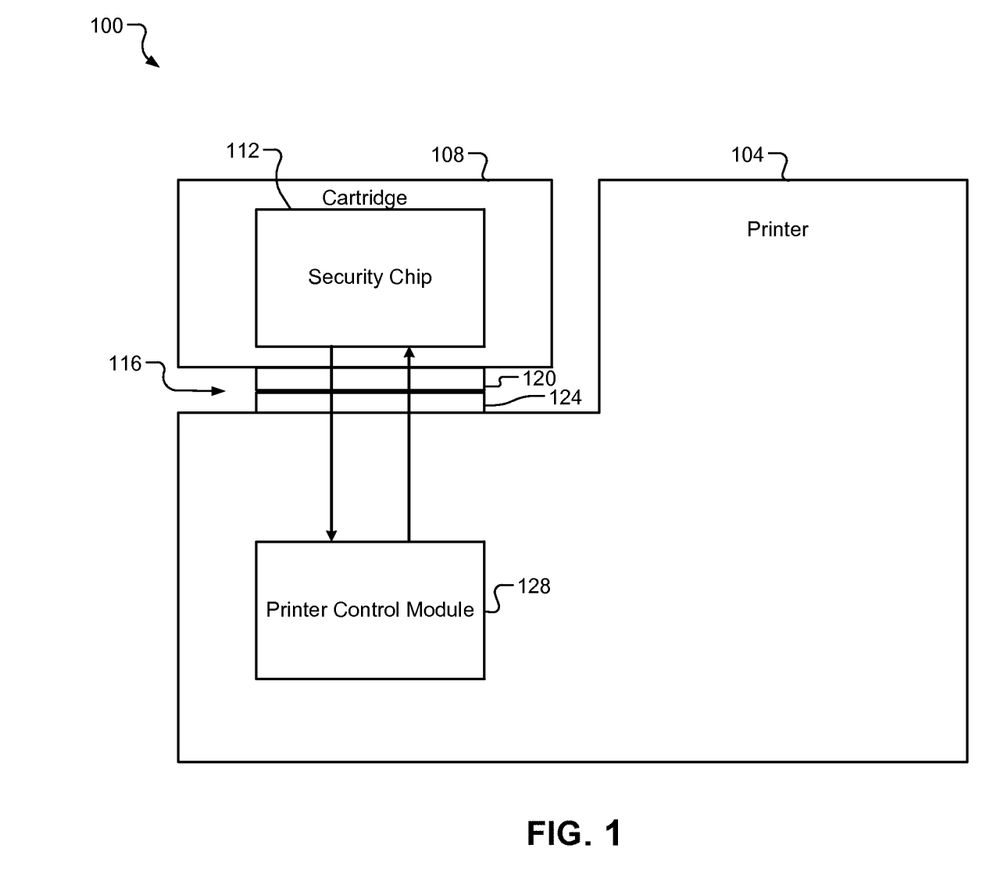
FIG. 1 is an example system configured to implement a fusible logic array and functions according to the principles of the present disclosure.

FIG. 1 shows an example system 100 configured to implement a fusible logic array and functions (FLAF) according to the principles of the present disclosure. The system 100 includes a printer 104 and a removable printer cartridge 108. The printer cartridge 108 includes a security chip 112 (e.g., an SoC) configured to implement the FLAF. However, although the system 100 is shown to include the printer 104 and the printer cartridge 108, the principles of the present disclosure can be implemented in any suitable consumer electronic device with a removable, replaceable, and/or consumable component, such as a mobile phone and a battery, charger, memory card, etc. In other words, the removable, replaceable, and/or consumable component of any consumer electronic device can be configured to implement the security chip 112 as described herein.

Further, as described herein, the security chip 112 is attached to a commodity or component (e.g., the printer cartridge 108) of a larger system (e.g., the system 100 including the printer 104) and the larger system performs the authentication challenge of the component through the attached/embedded security chip 112. However, in other embodiments, the security chip 112 may be attached/embedded into any product, and subsequently "read" by an external terminal or reader device ("a reader terminal") that acts as an authenticating authority. The reader terminal issues authentication an challenge to the security chip 112 to securely identify the security chip 112 and the product the security chip 112 is embedded/attached to. In embodiments, the reader terminal may only be used as needed or on an occasional basis (i.e., not continuously). For example only, the reader terminal may be used similar to a barcode reader at a point-of-sale, inventory control, and/or port of entry location to identify the authenticity of the product.

In embodiments, the security chip 112 could be attached/embedded to the product and used only during the process of authenticating the source and identity of the product. For example, the security chip 112 may be implemented in a luxury item that may be subject to counterfeit replacements. While a specific luxury item may be replicated, the security chip 112 could be used to authenticate the corresponding product. If the security chip 112 is missing or fails its own authenticity challenge, the authenticity of the luxury item could be questioned. The security chip 112 may not be an instrumental function of the luxury item example other than to serve as an authentication mechanism of the luxury item. As a further example, if the luxury item included branded clothing, the security chip 112 may have no value to the appeal, appearance, durability, or function of the clothing, but could be used when purchasing the clothing at a point of sale for authentication as the branded product.

Accordingly, while FIG. 1 is described with respect to the security chip 112 being located within the printer cartridge 108, in other implementations the printer 104 and/or selected components of the printer 104 may be replaced by a temporary or removable connection (e.g., a wired or wireless connection) to a reader terminal configured to interface with the security chip 112 embedded into the printer cartridge 108 or other electronic or non-electronic consumer device, a luxury item, clothing, etc.

The printer cartridge 108 is removably inserted into the printer 104 and coupled to the printer 104 via, for example only, a pressure point connector 116. For example, the pressure point connector 116 corresponds to a plug portion 120, disposed on the printer cartridge 108, that inserts into a socket portion 124 disposed on the printer 104. For example only, the plug portion 120 may include one or more plated contacts that, when inserted, electrically communicate with respective plated contacts within the socket portion 124 of the pressure point connector 116.

The printer 104 includes a printer control module 128 that communicates (e.g., over an I$^2$C bus) with the printer cartridge 108 via the pressure point connector 116. For example, the printer cartridge 108 includes one or more ink reservoirs and dispenses ink from the ink reservoirs onto a page under control of the printer control module 128. For example only, the printer control module 128 controls the printer cartridge 108 according to a print file and corresponding print job executed by the printer 104.

The printer control module 128 further communicates with the security chip 112 to verify the authenticity of the printer cartridge 108. For example, the printer control module 128 communicates with the security chip 112 to verify that the printer cartridge 108 is an approved accessory (i.e., not a counterfeit component). Accordingly, the printer control module 128 prevents counterfeit and/or unapproved printer cartridges from being used with the printer 104.

The security chip 112 according to the principles of the present disclosure includes an FLAF circuit to implement a challenge and response verification process. For example, the printer control module 128 outputs a challenge in the form of a seed (e.g., a predetermined value, such as a string of binary data). The security chip 112 receives the seed and generates a response in the form of a key. For example only, the key corresponds to a value that is generated by inputting the seed to a logic array. The logic array is configured (e.g., programmed) to output a predetermined value in response to a given seed. The printer control module 128 compares the key to an expected key associated with the seed provided to the security chip 112. If the key received from the security chip 112 matches the expected key, the printer control module 128 verifies that the printer cartridge 108 is an approved accessory and continues operation of the printer 104. Conversely, if the key received from the security chip 112 does not match the expected key, the printer control module 128 may retransmit the seed or output a new seed, prevent further operation of the printer 104 with the printer cartridge 108, and/or take other suitable remedial actions.

For example only, the remedial actions correspond to system security policies created by a system owner, including, but not limited to, entirely disabling functions of the system, reductions of performance or quality, and/or notifying a user of the system that the commodity/component product is non-authentic, etc.

The FLAF circuit in the security chip 112 (implemented using, for example only, a 2×3 mm SoC/package) includes a programmable logic array having one or more functions that are hidden or unobservable as described below in more detail. For example only, the security chip 112 implements a plurality of fusible links between inputs (i.e., inputs for receiving the seed) and outputs (i.e., outputs for providing the key) that conceal logical functions between the input and the outputs. The fusible links may correspond to one-time electrically programmable fuses. Consequently, attempts to counterfeit the security chip 112 may be hindered because the logic performed on the inputs by the security chip 112 is more difficult to ascertain.

Figure 2:
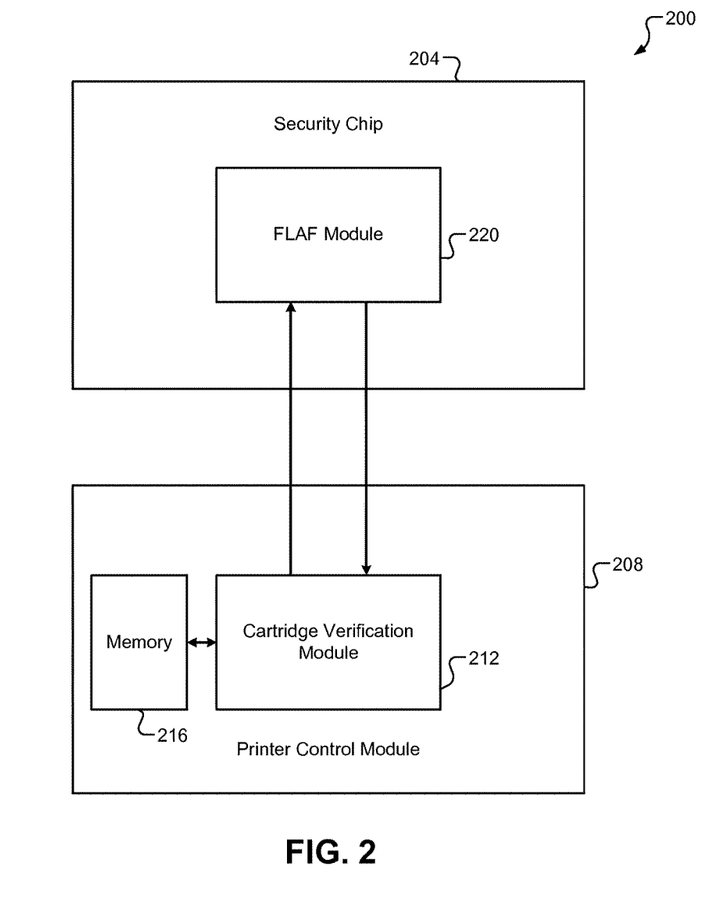
FIG. 2 is an example system including a security chip according to the principles of the present disclosure.

Referring now to FIG. 2, an example system 200 including a security chip 204 according to an embodiment is shown in more detail. A printer control module 208 communicates with the security chip 204 to verify the authenticity of the security chip 204. For example, the printer control module 208 includes a cartridge verification module 212 and memory 216. The memory 216 may store information related to verifying the security chip 204. For example, the information may include, but is not limited to, one or more predetermined seeds to be provided to the security chip 204 and corresponding expected keys to be compared to the keys received from the security chip 204.

The security chip 204 includes an example FLAF module 220 that implements an FLAF circuit according to an embodiment of the present disclosure. The FLAF module 220 is configured to provide a key to the cartridge verification module 212 in response to a seed received from the cartridge verification module 212. The FLAF module 220 includes a programmable logic array implementing a plurality of fusible links as described below in more detail.

Figure 3:
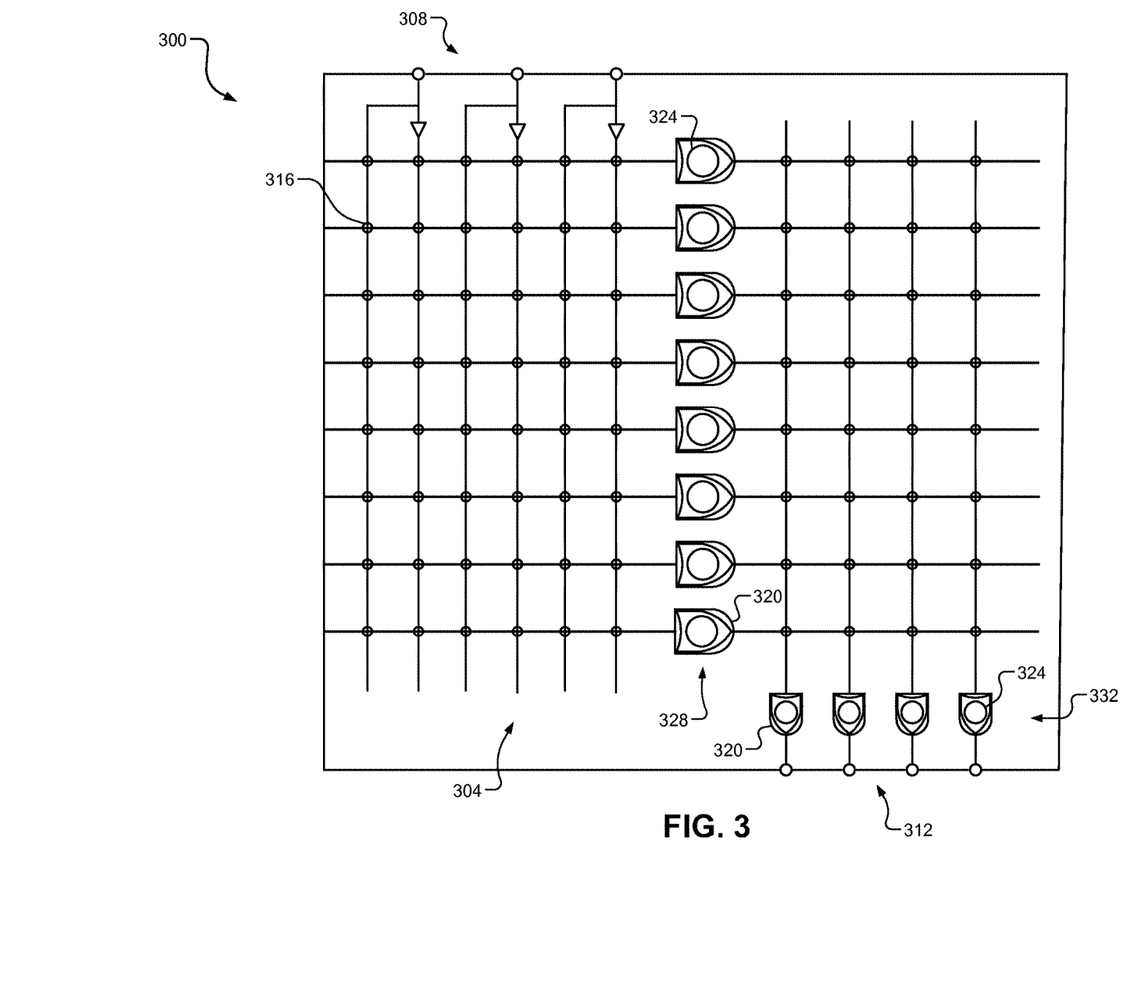
FIG. 3 is an example fusible logic array and functions circuit according to the principles of the present disclosure.

FIG. 3 shows an example FLAF module 300 implementing an FLAF circuit 304 according to an embodiment of the present disclosure. The FLAF circuit 304 corresponds to a programmable logic array including a plurality of fusible links (i.e., a fusible logic array). The circuit 304 includes one or more inputs 308 configured to receive, for example, a seed from the cartridge verification module 212 and one or more outputs 312 configured to provide a corresponding key (e.g., a logic result) in response to the received seed. The circuit 304 generates the key based on the seed and a configuration of various interconnections and logic functions of the circuit 304. In particular, the circuit 304 generates the key based on respective states of a plurality of fusible links 316. For example only, the outputs 312 correspond to a combination of a sum of products (SoP) logic equation and a product of sums (PoS) logic equation.

For example, the fusible links 316 may be provided at various intersections (e.g., intersection between metal interconnections) of the inputs 308 and/or inverted ones of the inputs 308, and at intersections of outputs of logic functions (i.e., gates) 320. Further, the logic functions 320 according to an embodiment of the present disclosure also include fusible links 324. The fusible links 316 and 324 may correspond to, for example only, one-time programmable (OTP) fusible links.

States of the fusible links 316 and 324 (e.g., fused or not fused) determine respective states of the intersections and/or logic functions 320. For example, a state of one of the fusible links 316 at an intersection indicates whether a corresponding metal interconnection is fused together. Conversely, a state of one of the fusible links 324 may indicate whether the logic function 320 corresponds to a logical AND function or a logical OR function. In other words, each logic function 320 may be configurable as each of an AND function and an OR function and the state of the corresponding fusible link 324 within the logic function 320 determines the output of the logic function.

Accordingly, the actual operation of each of the logic functions 320 is unobservable, or "hidden," as a result of the fusible link. In other words, because each logic function, when viewed, includes structure corresponding to both a logical AND function and a logical OR function, it is not readily discernible whether the actual output of the logic function will correspond to an AND operation or an OR operation. For example, an individual attempting to reverse engineer and counterfeit the security chip 204 may conclude that the outputs 308 correspond to an SoP operation when the fusible links 324 actually configure the logic functions 320 to perform a PoS operation, or vice versa.

In embodiments, operations of the logic functions 320 may be symmetrically assigned using the fusible links 324, and/or may be randomly determined or otherwise asymmetrically assigned. For example, the circuit 304 may include a first AND/OR plane 328 and a second AND/OR plane 332.

In an embodiment, each of the AND/OR planes 328 and 332 may be symmetric. For example, i) all of the logic functions 320 in the first AND/OR plane 328 and the second AND/OR plane 332 may correspond to logical AND functions, ii) all of the logic functions 320 in the first AND/OR plane 328 and the second AND/OR plane 332 may correspond to logical OR functions, iii) all of the logic functions 320 in the first AND/OR plane 328 may correspond to logical AND functions while all of the logic functions 320 in the second AND/OR plane 332 may correspond to logical OR functions, or iv) all of the logic functions 320 in the first AND/OR plane 328 may correspond to logical OR functions while all of the logic functions 320 in the second AND/OR plane 332 may correspond to logical AND functions.

In another embodiment, the one or both of the AND/OR planes 328 and 332 may be randomly assigned or otherwise asymmetric. For example, i) the logic functions 320 of the first AND/OR plane 328 may include both logical AND functions and logical OR functions while the logic functions 320 of the second AND/OR plane 332 include only logical AND functions or logical OR functions, ii) the logic functions 320 of the second AND/OR plane 332 may include both logical AND functions and logical OR functions while the logic functions 320 of the first AND/OR plane 328 include only logical AND functions or logical OR functions, or iii) the logic functions 320 of each of the first AND/OR plane 328 and the second AND/OR plane 328 include both logical AND functions and logical OR functions.

Accordingly, even if an individual is able to determine or assume an actual operation of one of the logic functions 320 (despite the difficulty caused by the fusible links 324), an accurate determination of the overall operation of the circuit 304 is still unlikely.

Figure 4:
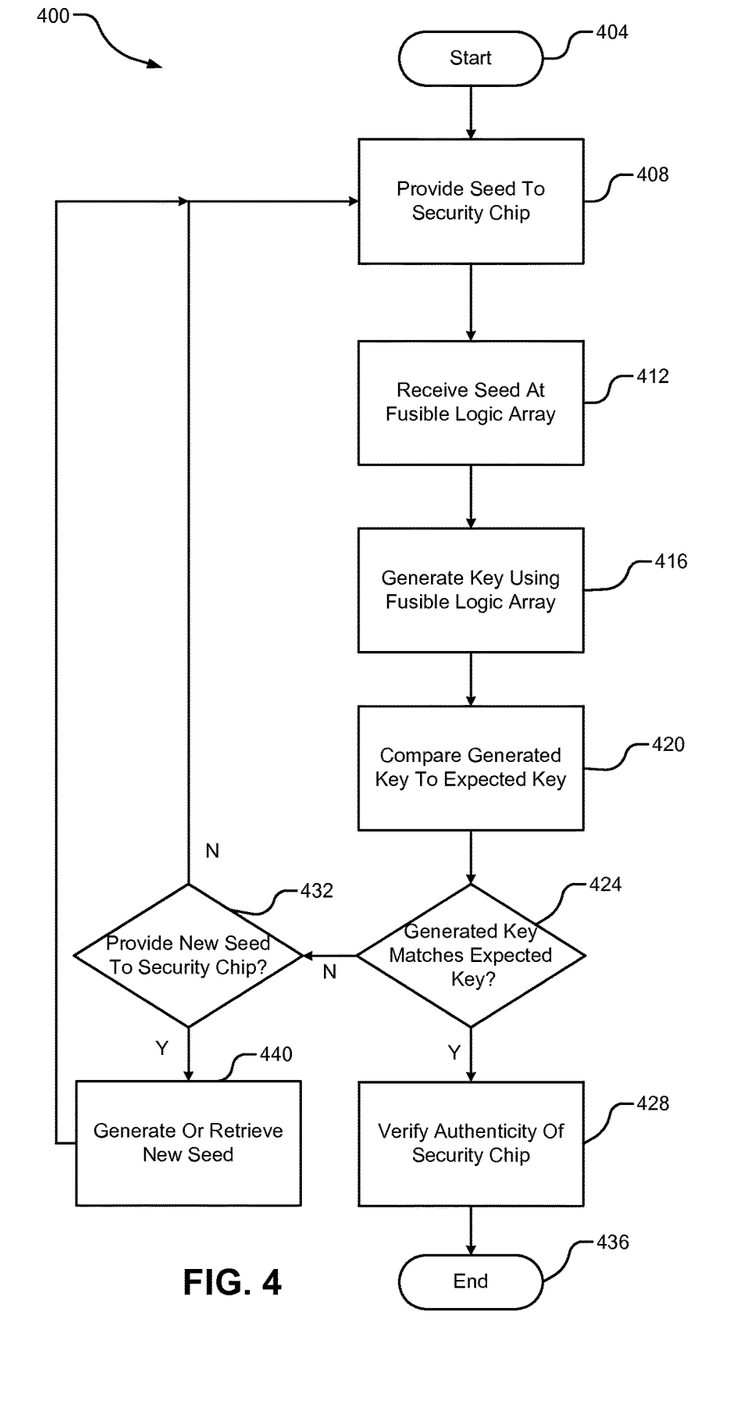
FIG. 4 is an example method for verifying a security chip having a fusible logic array and functions circuit according to the principles of the present disclosure.

FIG. 4 shows an example method 400, beginning at 404, for verifying a security chip having a fusible logic array according to the principles of the present disclosure. At 408, the method 400 provides a seed to the security chip. For example, a verification module, circuit, or other component of a consumer electronic device may generate the seed, retrieve a predetermined seed from memory, etc., and output the seed. At 412, the method 400 receives the seed at the fusible logic array. At 416, the method 400 generates a key based on the received seed and a configuration of the fusible logic array. For example, the method 400 generates the key based on respective states of a plurality of fusible links of the fusible logic array. At 420, the method 400 compares the key to an expected key corresponding to the seed. For example, the expected key may be retrieved from the memory for the comparison. At 424, the method 400 determines whether the key matches the expected key. If true, the method 400 continues to 428. If false, the method 400 continues to 432. At 428, the method 400 verifies that the security chip is authentic and ends at 436.

At 432, the method 400 determines whether to provide a new seed to the security chip. If true, the method 400 continues to 440. If false, the method 400 continues to 408. At 440, the method 400 generates or retrieves a new seed and continues to 408.

Figure 5:
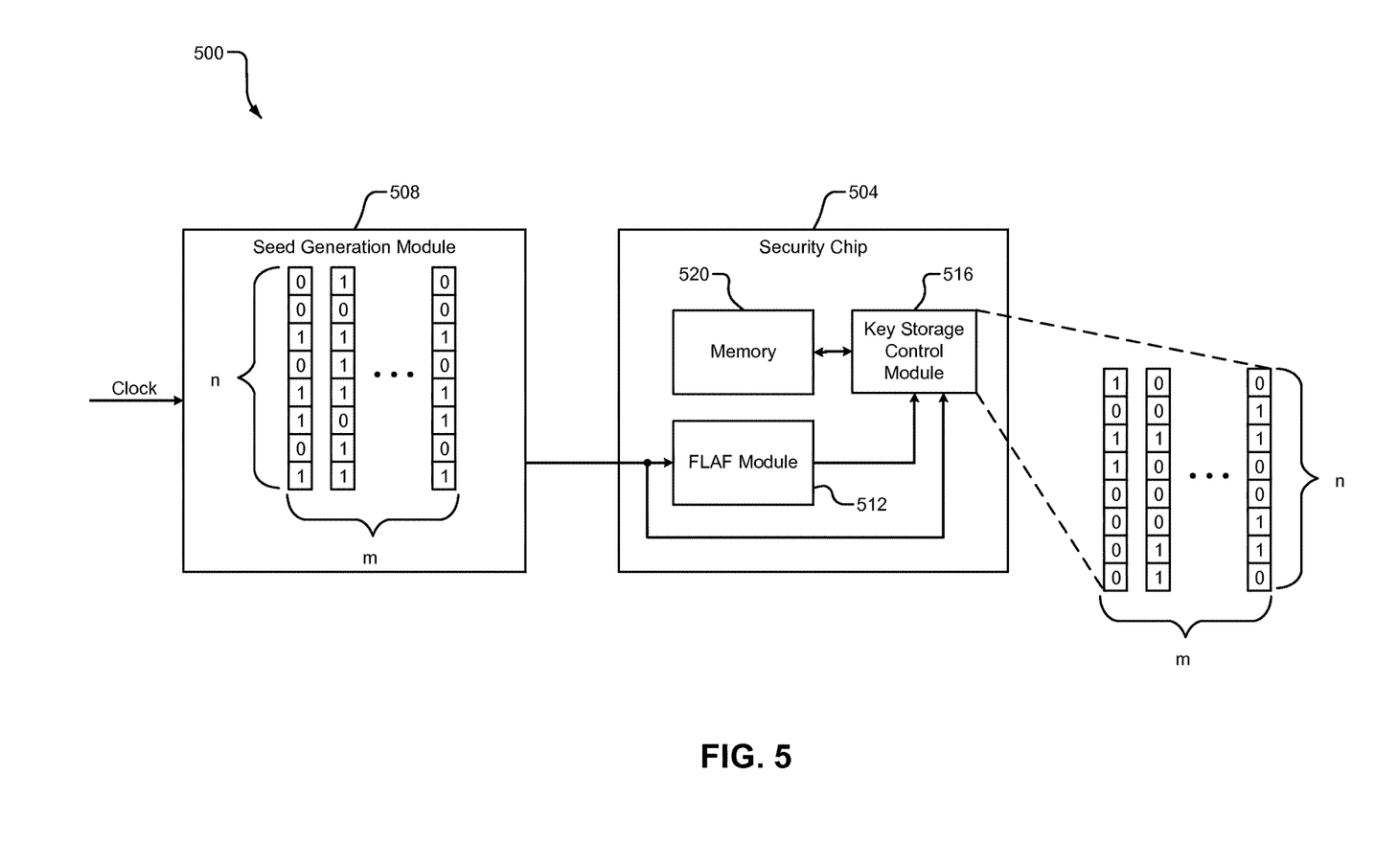
FIG. 5 is an example system for generating and storing a silicon fingerprint on a security chip according to the principles of the present disclosure.

FIG. 5 shows an example system 500 for generating and storing a silicon fingerprint (e.g., one or more seed and key value pairs) on a security chip 504 (e.g., prior to, during, and/or subsequent to fabrication of the security chip 504) according to an embodiment of the present disclosure. The system 500 includes the security chip 504 and a seed generation module 508. The seed generation module 508 provides one or more (e.g., m, where m is an integer) randomly generated or predetermined seeds of n bits (e.g., where n is an integer). For example only, n may correspond to 8 while m corresponds to 256 (e.g., 0 through 255, or all 256 possible states of an 8 bit value). Alternatively, m may correspond to only a subset of all of the possible states of the n bit value. The m seeds are provided in accordance with a clock signal (e.g., the seed generation module 508 successively provides the m seeds in accordance with pulses of the clock signal).

The security chip 504 includes an FLAF module 512, a key storage control module 516, and memory 520 (e.g., non-volatile memory). The FLAF module 512 receives the m seeds and generates m results (e.g., m corresponding keys) based on the m seeds and the programmed logic functions of the FLAF module 512 as described in FIGS. 1-4. The key storage control module 516 receives the m seeds from the seed generation module 508 and the m keys from the FLAF module 512, and then selectively stores the m seeds and the m keys (i.e., m seed-key pairs), or a subset of the m seed-key pairs, in the memory 520. For example, if m is relatively large (e.g., all 256 possible values of an 8 bit seed and corresponding keys), the size of the memory 520 would need to be sufficient to store all m seed-key pairs. Accordingly, the key storage control module 516 may store only a selected subset of the m seed-key pairs to reduce the required size of the memory 520.

For example, the key storage control module 516 is configured to selectively mask selected seed-key pairs and only store k of the m seed-key pairs (i.e., where k is an integer less than m). For example only, the k stored seed-key pairs may correspond to k random time slots in which the key storage control module 516 does not mask the seed received from the seed generation module 508 and the corresponding key received from the FLAF module 512. In this manner, the security chip 504 is configured to generate m keys corresponding to the m seeds received from the seed generation module 508 and store k selected seed-key pairs in the memory 520. For example only, the k selected seed-key pairs may correspond to 4, 8, 16, etc. random samples of the m seed-key pairs. The k selected time slots may be selected by the key storage control module 516 and/or the seed generation module 508 (e.g., by executing a manufacturing test program or algorithm).

Each security chip 504 configured using the system 500 may therefore store a different set of the k seed-key pairs. For example, for each security chip 504, a different set of m seeds may be provided to the corresponding FLAF module 512. For example only, if m is less than all possible values of an n bit seed, and/or the seeds are randomized or provided in a random sequence, then each security chip 504 may receive a different set of m seeds. Alternatively, each security chip 504 may receive a same set of m seeds but store a different set of k seed-key pairs. Accordingly, each security chip 504 stores a different set of k seed-key pairs in the memory 520, which corresponds to a unique silicon fingerprint for each security chip 504.

The logic functions of the FLAF module 512 may be programmed (i.e., selected fusible links 324 of the logic functions 320 may be fused/not fused) during fabrication of the security chip 504 and/or during seed-key pair generation as described in FIG. 5. For example, prior to providing the m seeds to the FLAF module 512, the seed generation module 508 or another device may be used to program the FLAF module 512 (i.e., fuse selected fusible links) according to a random function. For example only, the random function may be based on a unique serial number of each security chip 504 and/or an additional random factor, such as the least significant bits of a real-time or other clock, or any other suitable random source.

In this manner, each security chip 504 is configured to generate a different set of outputs for a given set of inputs. When the programming of the security chip 504 is complete (e.g., selected fusible links are fused according to the random function), the seed generation module 508 provides the m seeds to the security chip 504.

Figure 6:
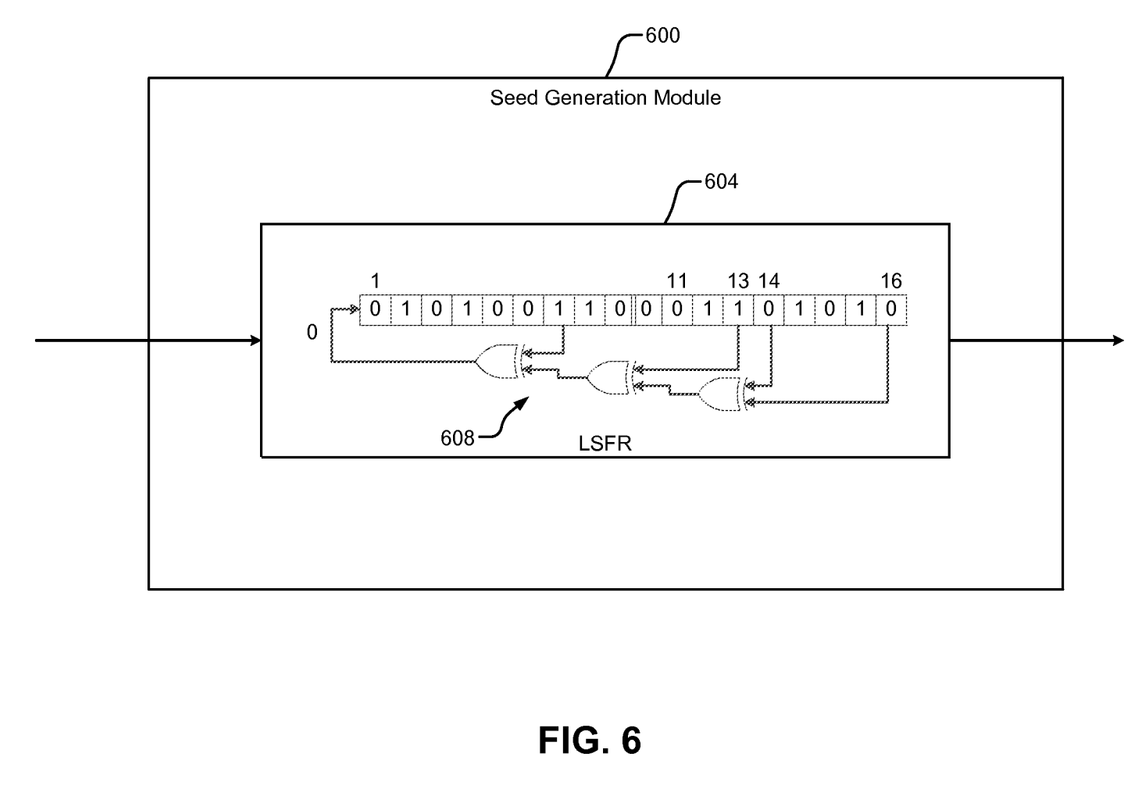
FIG. 6 is an example seed generation module configured to generate m seeds according to the principles of the present disclosure.

FIG. 6 shows an example seed generation module 600 configured to generate m seeds according to an embodiment. The seed generation module 600 generates the m seeds in accordance with a clock signal. In particular, the seed generation module 600 includes a linear feedback shift register (LFSR) 604 configured to generate the m seeds. For example, an 8-bit wide LFSR using 5 taps in a feedback loop may generate a non-repeating sequence of 255 states. The non-repeating sequence corresponds to a binary numeral system analogous to Gray code or natural binary code. The generated sequence of values allows the LFSR 604 to be used as a non-binary sequence generator.

As shown in FIG. 6, the LSFR 604 corresponds to a 16 bit Fibonacci LFSR with feedback taps on bit positions 16, 14, 13, 11, and 1. Accordingly, first and last bits (i.e., bit positions 16 and 1) are connected together in a feedback path 608 including other selected bits (e.g., bit positions 14, 13, and 11) to determine a next output state of the LFSR 604. A corresponding feedback polynomial of the LFSR 604 can be represented as $x^{16}+x^{14}+x^{13}+x^{11}+1$.

Figure 7:
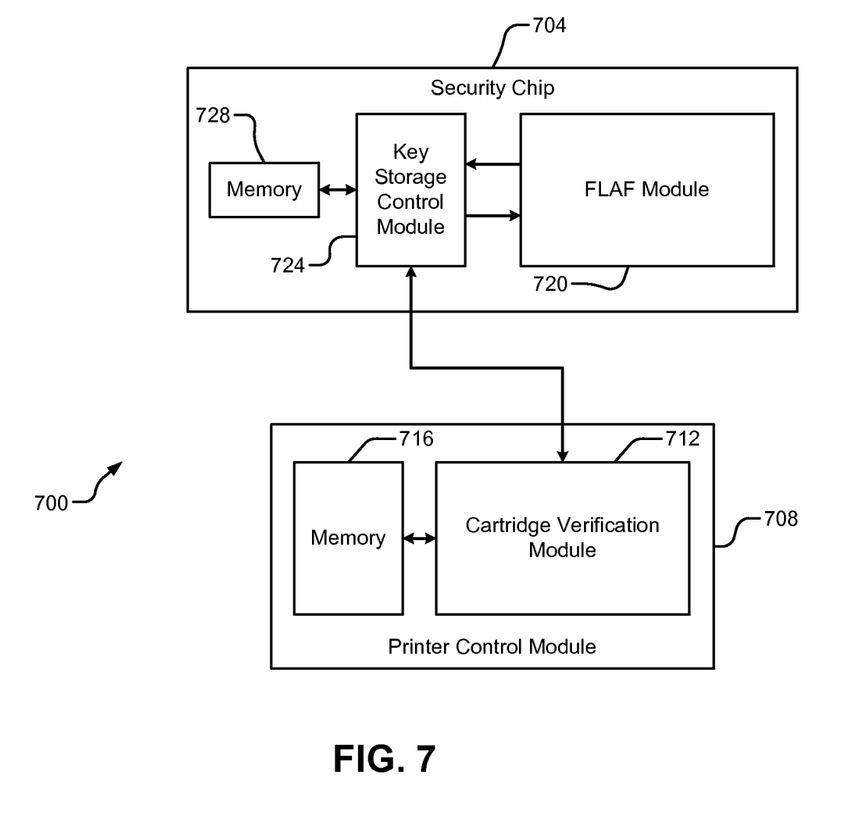
FIG. 7 is a system including an example security chip configured to perform a self-verification process according to the principles of the present disclosure.

FIG. 7 shows a system 700 including an example security chip 704 (e.g., an example of the security chip 504 as described in FIG. 5). The system 700 includes the security chip 704 and a printer control module 708. The printer control module 708 includes a cartridge verification module 712 and memory 716. The printer control module 708 may be configured to operate in a manner similar to the printer control module 208 as described in FIG. 2. For example, the memory 716 may store information related to verifying the security chip 704, such as one or more predetermined seeds to be provided to the security chip 704 and corresponding expected keys to be compared to the keys received from the security chip 704. Verifying the authenticity of the security chip 704 in this manner may be referred to as a first verification mode.

The printer control module 708 may also be configured to operate in a second verification mode. In the second verification mode, the cartridge verification module 712 transmits a verification request to the security chip 704. The verification request corresponds to a request for the security chip 704 to perform a self-verification process. The security chip 704 performs the self-verification process and provides a result (e.g., indicating whether the security chip 704 is authentic) to the printer control module 708.

The security chip 704 includes an FLAF module 720, a key storage control module 724, and memory 728. The FLAF module 720, key storage control module 724, and memory 728 are configured similar to the FLAF module 512, key storage control module 516, and memory 520 as described in FIG. 5. For example, the key storage control module 724 is configured to retrieve one or more of k seed-key pairs stored in the memory 728 (e.g., as stored during seed-key generation as described in FIG. 5), provide each seed to the FLAF module 720, and receive a corresponding key from the FLAF module 720. In particular, in the second verification mode, the key storage control module 724 is configured to receive the verification request from the cartridge verification module 712 and, in response to the verification request, retrieve the one or more of the k seed-key pairs stored in the memory 728 and provide each seed to the FLAF module 720.

The key storage control module 724 receives, for each seed provided, a key from the FLAF module 720. For example, the FLAF module 720 outputs a key based on the respective programming (i.e., based on which fusible links are fused, not fused, etc.) of the security chip 704. The key storage control module 724 compares the key received from the FLAF module 720 to the corresponding key (i.e., an expected key) of the seed-key pair retrieved from the memory 728. In other words, for a given seed-key pair retrieved from the memory 728, the key storage control module 724 provides the seed to the FLAF module 720, receives a key from the FLAF module 720, and compares the key received from the FLAF module 720 to the corresponding key in the retrieved seed-key pair.

Accordingly, the security chip 704 itself verifies the authenticity of the security chip 704 based on whether the FLAF module 720 returns the expected key for a seed-key pair retrieved from the memory 728 (i.e., performs a self-verification process). For example, the key storage control module 724 may verify that the FLAF module 720 returns the expected key for one, some, or all of the k seed-key pairs stored in the memory 728 in response to receiving the verification request from the cartridge verification module 712. If each of the keys output by the FLAF module 720 matches the expected key in the respective seed-key pair, the key storage control module 724 provides a result indicating that the security chip 704 is authentic.

For example, the key storage control module 724 may be configured to only transmit the result if each of the keys matches the respective expected keys (i.e., if the security chip 704 was determined to be authentic). Accordingly, if the cartridge verification module 712 does not receive the result within a predetermined period, the cartridge verification module 712 may determine that the security chip 704 is not authentic and perform one or more remedial actions as described above in FIG. 1. In other embodiments, the result may include a first value (e.g., "1") to indicate that the security chip 704 is authentic or may include a second value (e.g., "0") to indicate that the security chip 704 is not authentic (i.e., one or more of the keys output by the FLAF module 720 did not match the respective expected key). A failure to generate a result indicating that the security chip 704 is authentic may be caused by, for example, one or more of the FLAF module 720, the key storage control module 724, and the memory 728 from being tampered with. The one or more remedial actions may include, but are not limited to, asserting an "alarm" condition where the security chip 704 and/or the cartridge verification module 712 prevents the printer control module 708 from operating with a printer cartridge including the security chip 704.

The printer control module 708 may be configured to operate in one of the first verification mode and the second verification mode and/or to operate in both the first verification mode and the second verification mode. For example, to verify the security chip 704, the printer control module 708 may be required to verify the security chip 704 using each of the verification modes in succession.

Figure 8:
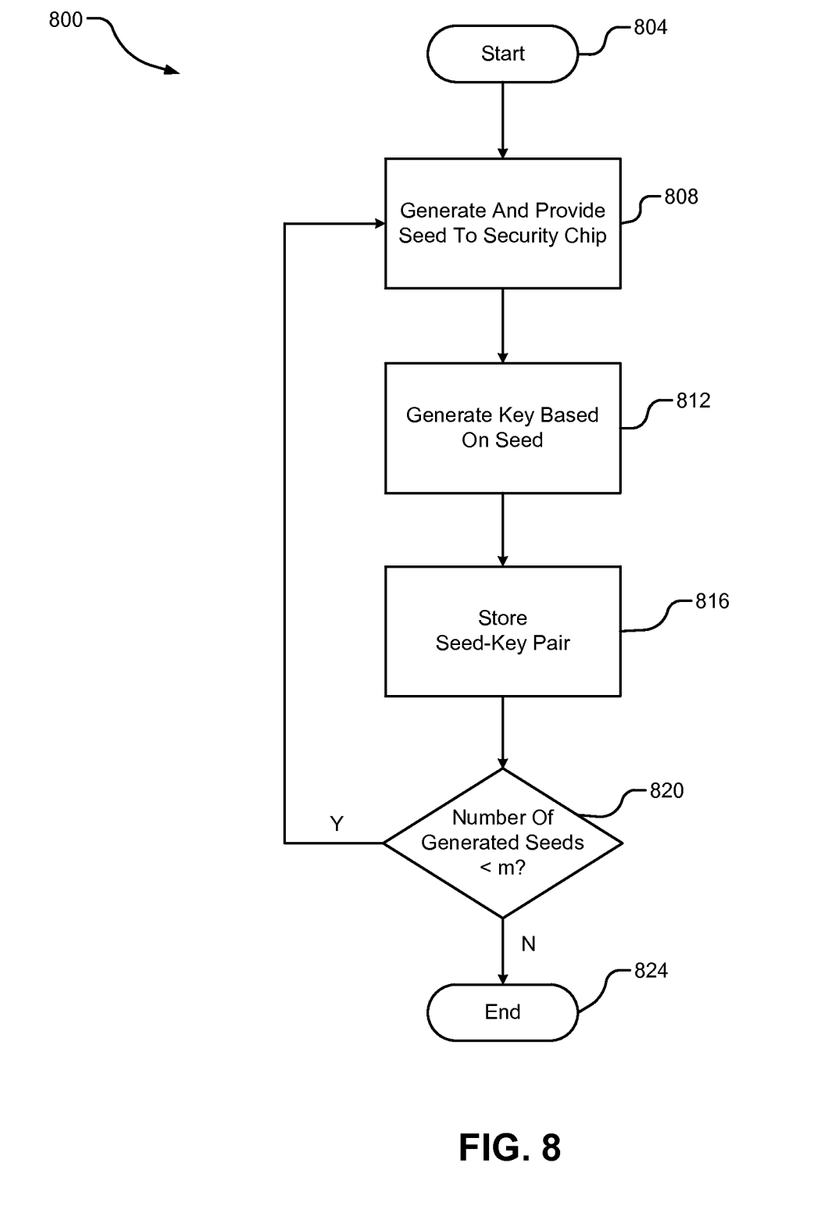
FIG. 8 is an example method for generating and storing seed-key pairs on a security chip according to the principles of the present disclosure.

FIG. 8 shows an example method 800 for generating and storing seed-key pairs on a security chip (e.g., as performed by the system 500 as described in FIG. 5). The method 800 begins at 804. At 808, the method 800 generates a seed and provides the seed to a security chip. For example, the method 800 provides the seed to a FLAF module of the security chip. At 812, the method 800 generates a key based on the seed. For example, a FLAF module generates the key based on the seed and states of one or more fusible links. At 816, the method 800 selectively stores the seed and the key as a seed-key pair. For example, the method 800 may store the seed-key pair if the seed-key pair corresponds to a selected one of k time slots (i.e., seed-key pair does not correspond to a masked time slot). At 820, the method 800 determines whether to generate and provide another seed. For example, the method 800 determines whether to generate and provide another seed based on whether m seeds have already been generated (e.g., whether a number of generated seeds<m). If true, the method 800 continues to 808. If false, the method 800 ends at 824.

Figure 9:
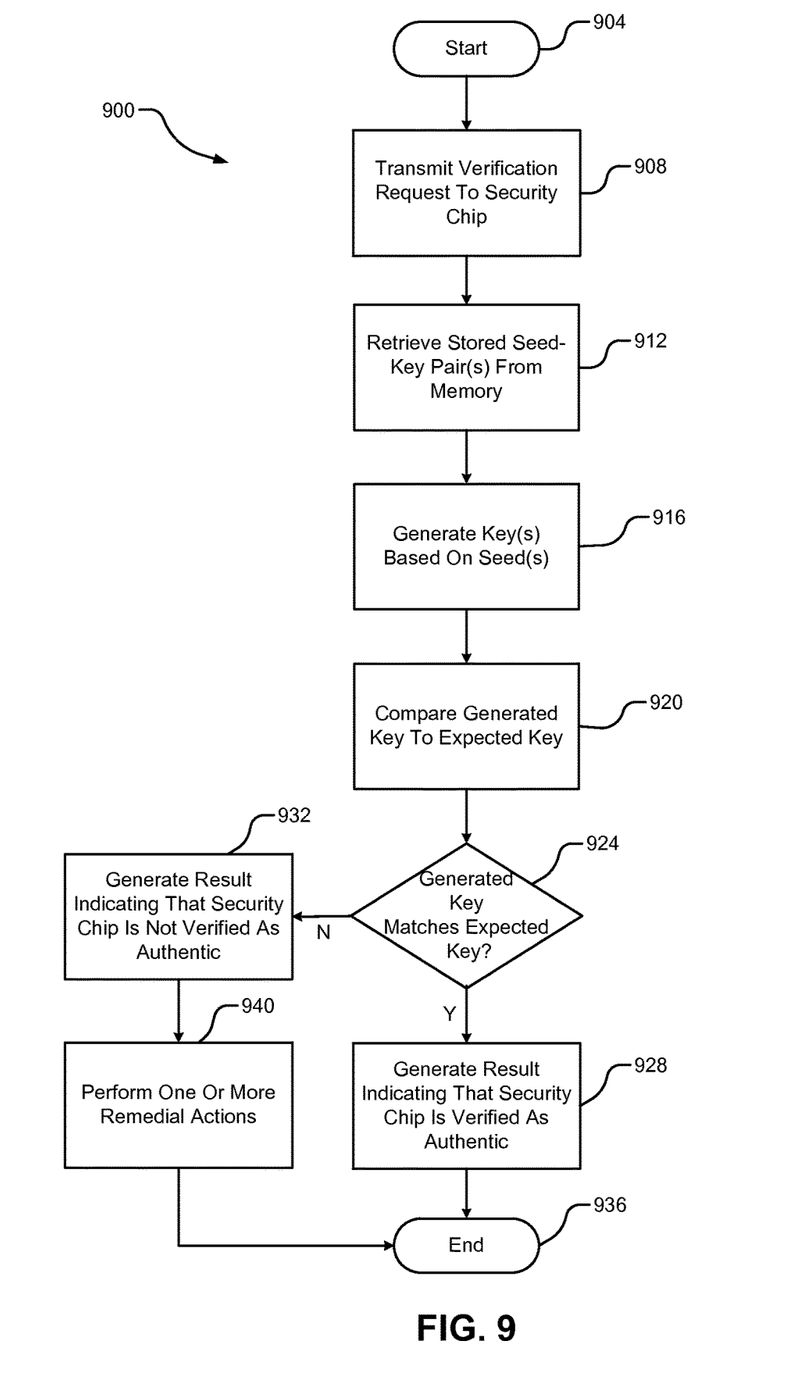
FIG. 9 is an example method for performing a self-verification process using a security chip according to the principles of the present disclosure.

FIG. 9 shows an example method 900 for performing a self-verification process using a security chip (e.g., as performed by the system 700 described in FIG. 7). The method 900 begins at 904. At 908, the method 900 transmits a verification request to the security chip. At 912, the method 900 retrieves one or more seed-key pairs previously stored in memory of the security chip. At 916, the method 900 generates keys based on the respective seeds of the seed-key pairs retrieved from the memory. For example, the method 900 provides each seed to an FLAF module and the FLAF module outputs a respective key based on the seed. At 920, the method 900 compares each generated key with the respective key of the seed-key pairs retrieved from the memory (i.e., the expected key). At 924, the method 900 determines whether each of the generated keys matches the respective expected keys of the seed-key pairs. If true, the method 900 continues to 928. If false, the method 900 continues to 932. At 928, the method 900 generates a result indicating that the security chip is verified as authentic and then the method 900 ends at 936.

At 932, the method 900 generates a result indicating that the security chip is not verified as authentic (or, in an embodiment, simply fails to generate a result that the security chip is verified as authentic within a predetermined period). At 940, the method 900 performs one or more remedial actions (e.g., the method 900 asserts an alarm condition, preventing a device from operating with an accessory device that includes the security chip), and then the method ends at 936.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Smalitalk, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A security chip, comprising:
    a fusible logic array configured to (i) receive a plurality of seed values and (ii) output a plurality of respective keys using the received plurality of seed values, wherein the respective keys correspond to logic results generated by the fusible logic array, and wherein the fusible logic array includes one or more fusible links; and
    a key storage control module configured to (i) receive the plurality of seed values, (ii) receive the plurality of respective keys, and (iii) store, in memory, a selected first seed value of the plurality of seed values and a selected first key of the plurality of respective keys, wherein the selected first seed value and the selected first key are stored as a seed-key pair,
    wherein the key storage control module is further configured to (i) receive a verification request, (ii) in response to the verification request, retrieve the seed-key pair from the memory, and (iii) selectively provide the first selected seed value of the seed-key pair to the fusible logic array, and
    wherein the key storage control module is further configured to (i) receive a key generated by the fusible logic array in response to receiving the first selected seed value and (ii) compare the key generated by the fusible logic array in response to receiving the first selected seed value to the first selected key of the seed-key pair.

2. The security chip of claim 1, wherein each of the plurality of seed values comprises a plurality of bits.

3. The security chip of claim 1, wherein each of the plurality of seed values is randomly generated.

4. The security chip of claim 1, wherein, to receive the plurality of seed values, the fusible logic array is configured to receive the plurality of seed values from a seed generation module external to the security chip, and wherein the seed generation module is configured to selectively provide the plurality of seed values in accordance with a clock signal.

5. The security chip of claim 4, wherein the seed generation module includes a linear feedback shift register configured to generate the plurality of seed values.

6. A system comprising the security chip of claim 4 and the seed generation module.

7. The security chip of claim 1, wherein the key storage control module is further configured to selectively provide a verification result in response to the comparison, and wherein the verification result indicates whether the security chip is authentic.

8. A printer cartridge including the security chip of claim 1.

9. A method for operating a security chip, the method comprising:
    using a fusible logic array,
        receiving a plurality of seed values, and
        outputting a plurality of respective keys using the received plurality of seed values, wherein the respective keys correspond to logic results generated by the fusible logic array, and wherein the fusible logic array includes one or more fusible links;
    receiving the plurality of seed values;
    receiving the plurality of respective keys;
    storing, in memory, a selected first seed value of the plurality of seed values and a selected first key of the plurality of respective keys, wherein the selected first seed value and the selected first key are stored as a seed-key pair;
    receiving a verification request;
    in response to the verification request, retrieving the seed-key pair from the memory;
    selectively providing the first selected seed value of the seed-key pair to the fusible logic array;
    receiving a key generated by the fusible logic array in response to receiving the first selected seed value; and
    comparing the key generated by the fusible logic array in response to receiving the first selected seed value to the first selected key of the seed-key pair.

10. The method of claim 9, wherein each of the plurality of seed values comprises a plurality of bits.

11. The method of claim 9, further comprising randomly generating each of the plurality of seed values.

12. The method of claim 9, wherein receiving the plurality of seed values includes receiving the plurality of seed values from a seed generation module external to the security chip, and further comprising selectively providing, using the seed generation module, the plurality of seed values in accordance with a clock signal.

13. The method of claim 12, further comprising generating the plurality of seed values using a linear feedback shift register.

14. The method of claim 9, further comprising to selectively providing a verification result in response to the comparison, wherein the verification result indicates whether the security chip is authentic.

15. The method of claim 9, wherein the security chip is located in a printer cartridge.

* * * * *